United States Patent [19]

Fraering, Jr.

[11] Patent Number: 4,757,595
[45] Date of Patent: Jul. 19, 1988

[54] PROCESS FOR PROTECTING ENDS OF OIL FIELD TUBULAR PRODUCTS

[75] Inventor: Camille M. Fraering, Jr., New Iberia, La.

[73] Assignee: Asgard Corporation, New Iberia, La.

[21] Appl. No.: 20,877

[22] Filed: Mar. 2, 1987

[51] Int. Cl.⁴ ............................................. B23P 11/02
[52] U.S. Cl. ........................................ 29/447; 29/458; 138/96 T; 264/159; 264/230; 285/381; 206/497
[58] Field of Search ............... 29/447, 458; 206/497; 138/96 T, 96 R; 264/159, 230; 285/381

[56] References Cited

U.S. PATENT DOCUMENTS

| | | | |
|---|---|---|---|
| 2,027,962 | 1/1936 | Currie | 264/230 |
| 2,938,569 | 5/1960 | Goodrich . | |
| 2,942,625 | 6/1960 | Costanzo . | |
| 3,187,777 | 6/1965 | Ashlock | 138/96 T |
| 3,355,202 | 11/1967 | Shannon | 29/447 UX |
| 3,406,685 | 10/1968 | May | 29/447 X |
| 3,544,672 | 12/1970 | Goda et al. | 264/230 |
| 3,800,396 | 4/1974 | Puchner | 29/447 X |
| 3,906,070 | 9/1975 | Lajovic | 264/230 X |
| 4,033,380 | 7/1977 | Weber | 138/96 T |
| 4,140,412 | 2/1979 | Vitt | 29/447 X |
| 4,157,100 | 6/1979 | Turk | 138/96 T |
| 4,168,726 | 9/1979 | Klennert | 138/96 R |
| 4,188,979 | 2/1980 | Nakamura et al. | 138/109 |
| 4,245,674 | 1/1981 | Nakamura et al. | 138/110 |
| 4,297,155 | 10/1981 | Jervis | 156/86 |
| 4,386,984 | 6/1983 | Jervis | 156/86 |
| 4,549,337 | 10/1985 | Newell et al. | 138/96 T X |
| 4,569,868 | 2/1986 | De Blauwe et al. | 138/96 R X |

FOREIGN PATENT DOCUMENTS 2740420 3/1979 Fed. Rep. of Germany .... 138/96 T

*Primary Examiner*—Charlie T. Moon
*Attorney, Agent, or Firm*—Mason, Fenwick & Lawrence

[57] ABSTRACT

A novel process and system is provided for protecting oil filed tubular goods such as subs, drill pipe, casings, tubing, drill collars, line pipe and the like having threaded or machined end coupling portions, against rust, pitting and moisture induced corrosion damage, wherein the machined, threaded or tool joint area of such tubular product are coated with grease, dope or like protective compounds and then is encased and protected against the weather and moisture attack by a shrinkable plastic wrapping enveloping end portions of the machined and grease coated tubular products protecting them by a shrink wrap encasement of low density polyethylene film or the like.

19 Claims, 2 Drawing Sheets

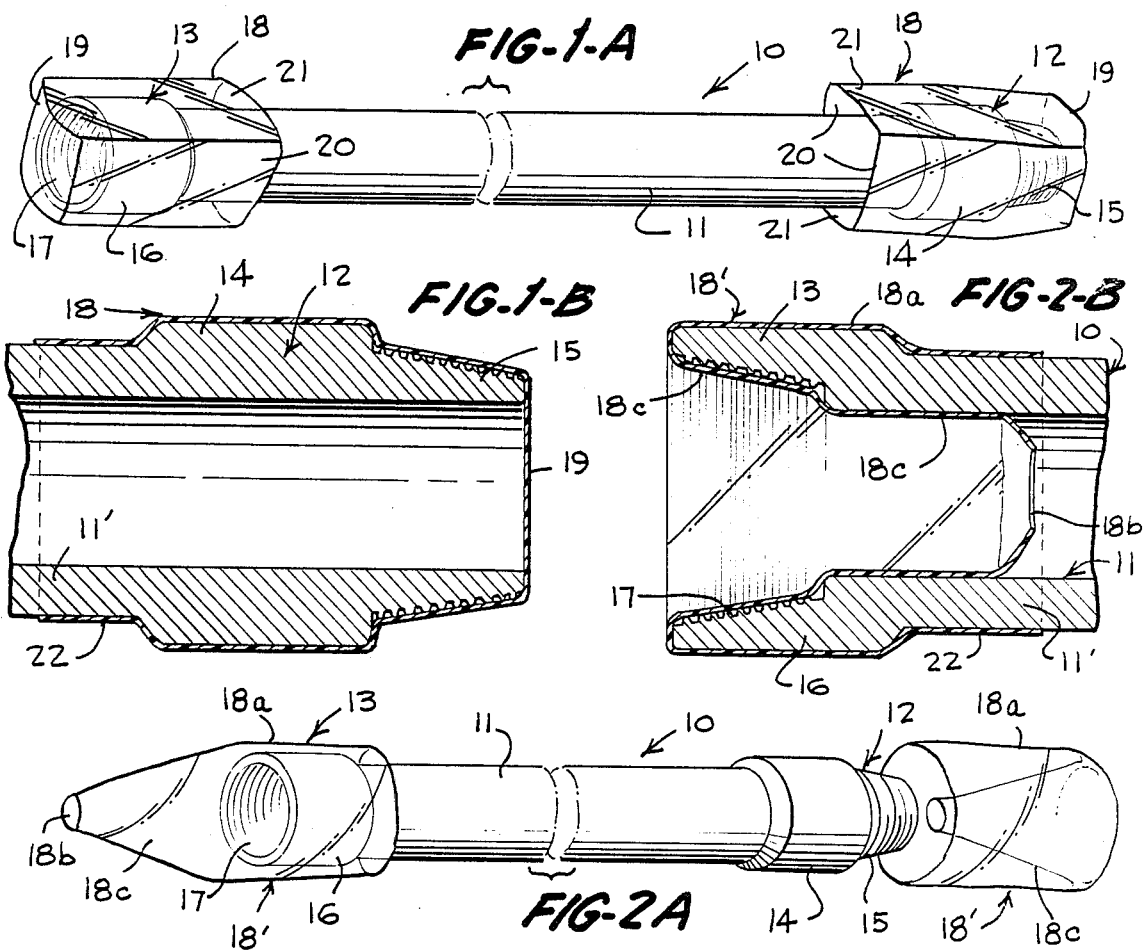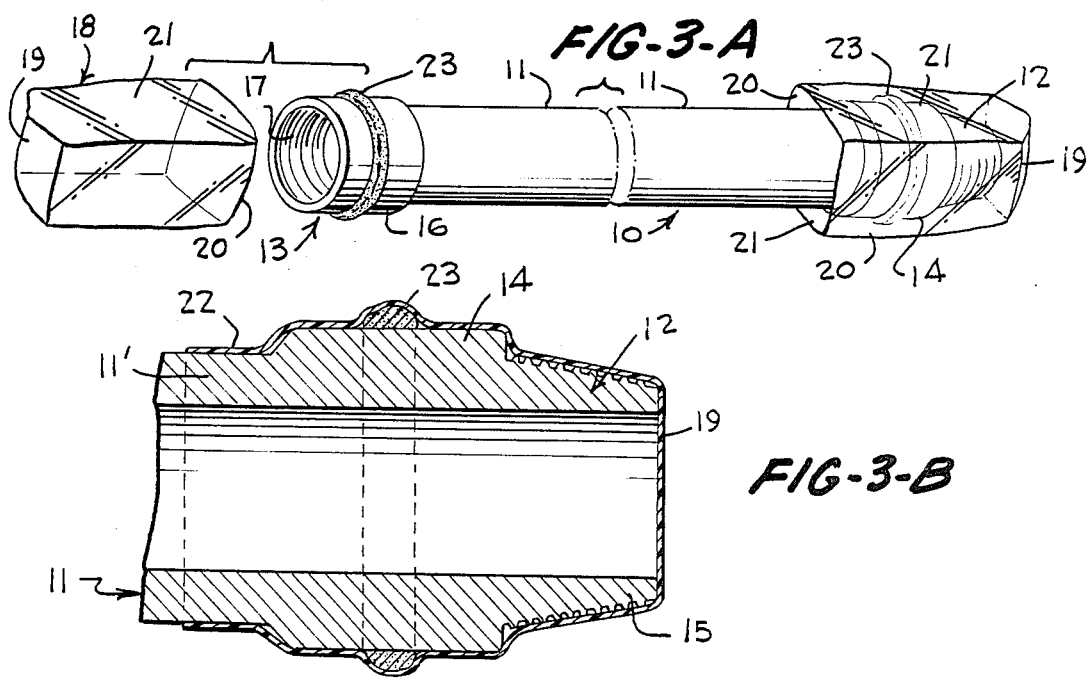

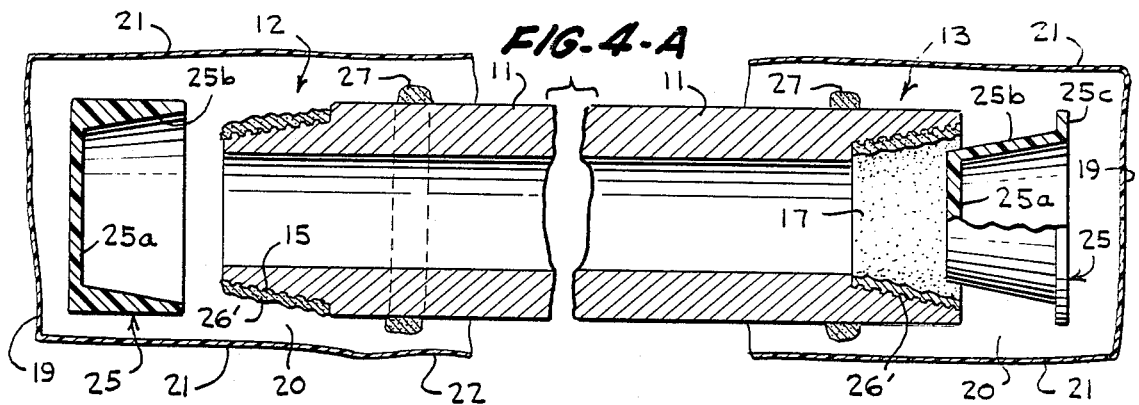
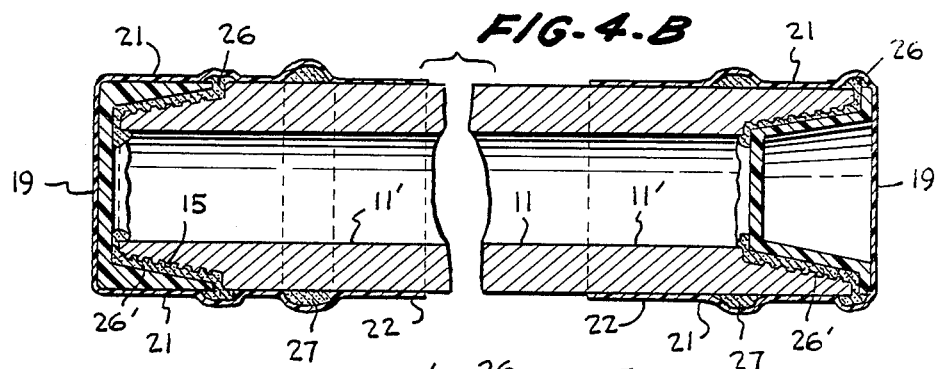
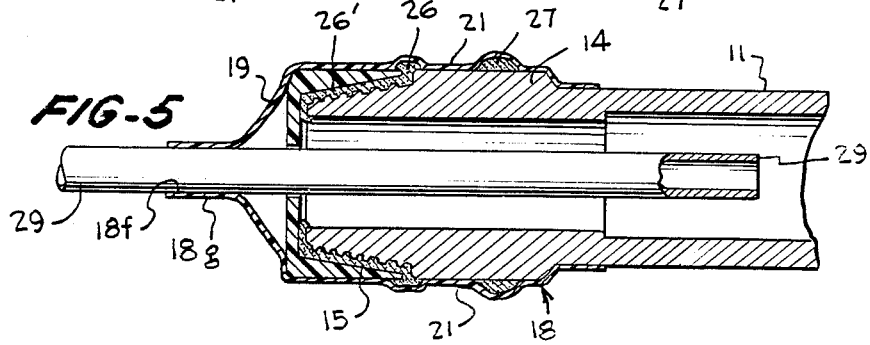
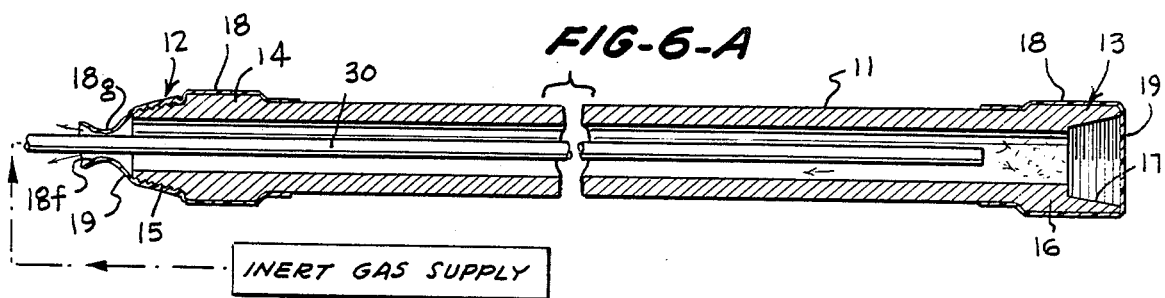
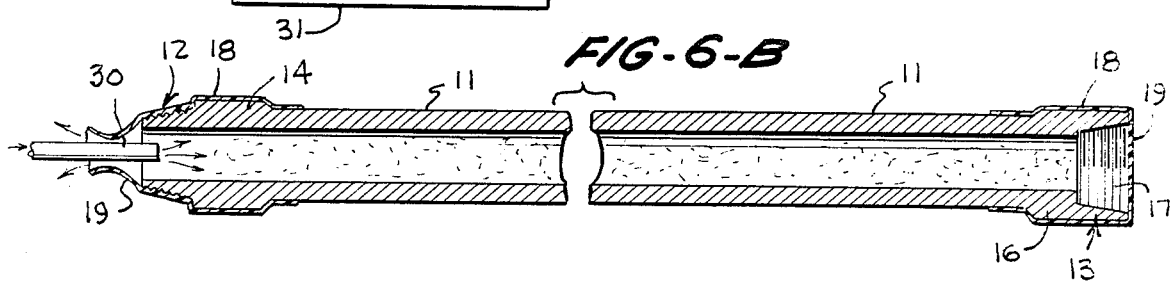

PROCESS FOR PROTECTING ENDS OF OIL FIELD TUBULAR PRODUCTS

BACKGROUND AND OBJECTS OF THE INVENTION

The present invention relates in general to processes and systems for protecting tool joints, machined surfaces, and other worked or shaped end formation of elongated articles, and more particularly to methods and apparatus for protecting tool joints and machined surfaces of elongated articles such as oil well drill pipe, drill collars, casings, tubing, subs and various oil field machined goods against water and moisture damage to such articles and against water and moisture entrusion into grease that may be used to protect the machine surfaces.

Oil field tubular goods, such as subs, drill pipe, casing, tubing, drill collar, line pipe and the like have connections on their ends that are threaded or otherwise shaped by machining which are extremely vulnerable to rusting and pitting. The problem is particularly acute in regard to storage of inventory supplies of such oil field tubular goods, which, in order to meet unpredictable varying demands, may be very great at one period of time and relatively slight at other periods of time, such that suppliers of such processed oil field tubular goods frequently have large quantities of them stacked in storage yards where they are exposed to the elements.

Heretofore, it has been a frequent practice to coat the machined threaded surfaces or the like with grease, dope, oil, or the like, as is well known in the industry, in an effort to protect the machined or threaded surface from damage by adverse weather conditions, but this technique of attempted protection of the threaded or machined surfaces has failed to achieve the desired goal with disturbing frequency. No matter how much grease, dope or oil is applied to the threaded or machined connection end portion of the oil field tubular goods, the effects of weather, hot sun and driving rain on such articles stacked in storage yards cause the protection to loose its protective coating, or water or moisture may penetrate through the grease, dope or oil and cause the threaded connection to rust. Either way, damage results to these threaded connections, such that such tubular goods must be cleaned and reprotected periodically with grease or oil, or oil type compounds, at considerable expense. Also, because of the knowledge gained from experience that the threaded machined portions of the tubular goods frequently become damaged during storage, the expense and inconvenience of regular inspection of the stored supplies of such pipes, casings and the like becomes necessary. If the rust is allowed to continue for any length of time, damage to the threaded area becomes so severe that the threaded ends of the tubular goods will have to be recut before they are delivered to the user.

Another problem arises in connection with the storage of such threaded or machined oil field tubular goods arising from accumulation of moisture in the hollow bores of the pipes or casings caused by their being partially sealed but not hermetically sealed, such that moisture accumulation occurs within the bore of the pipe or casing which causes rust or corrosion rendering the article unsatisfactory for use.

An object of the present invention, therefore, is the provision of a novel process and system for protecting such oil field tubular goods such as subs, drill pipe, casings, tubing, drill collars, line pipe and the like having threaded or machined end coupling portions, against rust, pitting and moisture induced corrosion damage, wherein the machined, threaded or tool joint area of such tubular product is encased and protected against weather and moisture attack by a shrinkable plastic wrapping enveloping end portions of the machined tubular products protecting them by a shrink wrap encasement of low density polyethylene film or the like.

Another object of the present invention is the provision of a novel process and system for protecting the end portions of oil field machined tubular products or the like as defined in the immediately preceding paragraph against moisture or weather damage causing corrosion, rust and the like, wherein the portions of the ends of the machined tubular product having threaded, machined or otherwise cut surfaces are first coated with grease, dope or like protective compounds over the machined surface portions thereof and are then encased in a shrinkable plastic film of low density polyester or the like extending entirely over the machined and grease coated area and extending beyond onto undisturbed and uncoated adjoining portions of the tubular pipe, casing or other product and which is shrunk in place to form an air-tight shrink wrap shielding the machined surface portion from driven rain, moisture and the like.

Yet another object of the present invention is the provision of a novel process and system for protecting threaded, machined or cut end portions of oil field tubular products as described in the two immediately preceding paragraphs from rain, moisture and damage effect from weather or climatic conditions, wherein one or more rings of sealing materials such as grease, silicone, putty or the like is/are formed on the exterior surface of the pipe, casing or tubular product spaced a short distance toward the mid-region thereof from the machined surface portion and the machined surface portion and ring or bead of material is enclosed in a shrinkable bag or wrap film of low density polyethylene or other plastic material by application of heat to form a shrink wrap providing a shield for protecting the enclosed tubular product portion from attack by moisture, rain wind, or the like.

Still another object of the present invention is the provision of a novel process and system for protecting threaded or machined end portion of oil field tubular products as defined in any of the three preceding paragraphs, wherein moisture accumulation within the interior of the tubular product is prevented by providing a vent tube, hose or the like in at least one end of the tubular product extending through the wall of the shrink wrap film material and extending far enough into the bore of the pipe, casing or tubular product to allow air to circulate and keep moisture from accumulating near the threaded area, or, after one end of the pipe or tubular product is sealed, an inert gas can be supplied to the vent tube to purge the interior of the pipe of oxygen, after which the vent tube can be quickly sealed to minimize corrosive condition in the interior of the tubular product during storage.

Other objects, advantages and capabilities of the present invention will become apparent from the following detailed description, taken in conjunction with the accompanying drawings illustrating a preferred embodiment of the invention.

BRIEF DESCRIPTION OF THE FIGURES

FIG. 1A is a perspective view of a drill pipe, representing a typical drill pipe, sub, drill collar, joint of tubing, line pipe, well casing, or similar oil field tubular product, having threaded or machined end portions each positioned in one form of shrinkable protective plastic bag for the machined or threaded ends thereof, depicting part of the process of the present invention and shown before shrinking of the protective plastic bag into the final shrink wrap plastic film enclosure condition, with parts of the bags broken away to show the ends of the drill pipe therein;

FIG. 1B is a fragmentary longitudinal section view to enlarge scale, of one end of the drill pipe and plastic film or bag enclosure of FIG. 1A, after the protective bag is shrunk in place to form the final shrink wrap enclosure;

FIG. 2A is perspective view of a drill pipe representative of oil field tubular products used in the process and system of the present invention, showing another version of the shrinkable protective plastic bag configuration usable therein;

FIG. 2B is a fragmentary section view, to enlarged scale, of one end of the assembly shown in FIG. 2A with the protective plastic bag shrunk into position to form the final shrink wrap plastic film enclosure;

FIG. 3A is a perspective view of a representative oil field drill pipe and shrinkable plastic bag similar to FIG. 1A, shown before shrinking of the bag into final position, with a circumscribing ring or bead of grease, putty, sealant or similar caulking material provided on the exterior surface of the drill pipe adjacent the machined or threaded surface area, as provided in practicing a modified version of the present invention;

FIG. 3B is a fragmentary section view, to enlarge scale of one end of the assembly shown in FIG. 3A, with the shrinkable plastic bags shrunk in final position on one end of the drill pipe;

FIG. 4A is a fragmentary section view of both end portions of the oil field drill pipe and associated shrinkable protective bags shrunk into position similar to FIG. 3B, but wherein end protector cap members are first applied to the threaded portions coated with grease and producing a grease bead formed by excess grease forced out at confronting edge portion of the protective cap members and drill pipe and a second ring of grease, putty, sealant or similar caulking material is applied at an inwardly spaced location from the excess grease bead similar to the caulking ring of FIG. 3A, showing the assembly before shrinking of the plastic enclosure to final shrink wrap condition; and FIG. 4B is a section view similar to FIG. 4A but showing the same after shrinking of the shrink wrap plastic bag or film enclosure to final shrink wrap condition;

FIG. 5 is a fragmentary section view similar to FIG. 3B, but showing of a vent tube or hose extending through the end wall portion of the shrink wrap protective bag or film enclosure to provide protection against wind driven rain damage and the like; and, FIGS. 6A and 6B are somewhat diagramatic section views of the typical oil field drill pipe with the shrink wrap plastic film or bag enclosure on both ends at an initial stage and at a stage near the end, respectively, of the purging procedure in one embodiment of the present invention wherein the interior of the sealed drill pipe is purged of oxygen with an inert gas;

DETAILED DESCRIPTION OF A PREFERRED EMBODIMENT

Referring to the drawings, wherein like reference characters designate corresponding parts throughout the several figures, and particularly to FIGS. 1A and 1B, there is shown an oil field drill pipe, indicated by the reference character 10, comprising an elongated hollow tubular pipe portion 11 having a male coupling end 12 and a female coupling end 13. As shown, the male coupling end includes an enlarged collar formation 14 over a short distance, for example several inches, spaced from the tip of the male coupling end and a threaded, somewhat conical, nose portion 15 protruding therefrom, sometimes referred to as the pin, adapted to be mated with a female coupling end 13 of the next adjacent drill pipe section. The female coupling end portion likewise has a female end collar formation 16 surrounding a female threaded section or socket portion 17 into which the threaded nose or pin portion 15 of the next adjacent drill pipe section adjoining the female end 13 is to be inserted to couple the pipe section together. This particular oil field drill pipe 10 shown herein is intended to be merely typical of the general range of oil field tubular goods, such as subs, drill pipes, casing, tubings, drill collars, line pipe and the like with which the present invention may be used, having connections on their ends which are threaded or machined and thus are vulnerable to rusting and pitting.

As previously described, damage caused by rusting and pitting of these threaded or machined surface areas 15 and 17 of oil field tubular products, even when processed in the usual manner by coating them with grease, dope or oil in an effort to protect them against the weather, driving rain and similar damaging weather effects, is frequently experienced, as a result of moisture or water induced corrosion, and thus they must be periodically inspected and many times recut, considerably increasing expense of the maintaining inventories of such oil field tubular products as well as causing irreparable damage in many instances such that the product becomes unusable. A process embodying the present invention for effecting reliable protection of such threaded or machined surface areas of drill pipe and similar oil field tubular products involves the use of shrinkable plastic wrapping, such as, low density polyethylene film, formed into bags, such as shown at 18 in FIGS. 1A and 1B, wherein the bags 18 initially are of slightly larger size than the male or female coupling ends 12, 13 which they are designed to protect and which are loosely fitted over the male and female coupling ends 12 and 13 respectively. The bags 18 are then shrink fitted tightly in place to intimately abut the threaded or machined surfaces 15, 17 and adjacent exterior surfaces of the drill pipe 10, for example enclosing also the collar formations 14 and 16 and regions of the elongated intermediate pipe portions 11 extending therebetween for a short distance toward the longitudinal center from the collars as shown in FIG. 1A. The shrink plastic film enclosure or bag 18 has a bottom or end wall 19 joined to vertical side walls 20 and horizontal side walls 21, (as viewed in FIG. 1A) in a manner providing air tight junctures where the bottom end wall joins the side walls. The shrinkable protective plastic film enclosures or bags 18 are placed in enveloping surrounding relation to the male coupling 12 and the female coupling end 13, to be protected, with the band-like throat zone or region, indicated at 22 in the drawings, adjoining the open end of the respective enclosure or bag 18 over an axial distance of at least several inches encircling and outwardly overlapping neck portions 11' of the drill pipe section immediately adjoining the collar formations 14 and 16. The shrinkable film enclosure or bag is then shrunk in place, for example, by means of fusing hot air from a hot air gun or blanket, or by other known shrink wrapping instrumentation and procedures, to cause the plastic film enclosure or bag to shrink into conforming and intimately contacting covering relation with the confronting surfaces of the threaded or machined surface areas 15, 17 and the adjacent collar formations 14, 16 and also the immediately adjoining neck portions 11' of the main drill pipe body 11.

To further enhance the sealing properties of the protective enclosure to provide a more effective seal against moisture, a vapor or air tight sealed enclosure may be produced in the manner illustrated in FIGS. 3A and 3B. FIGS. 3A and 3B show a similar typical drill pipe section 10 having a male coupling end 12 and female coupling end 13 including male and female collar formation 14 and 16, threaded or machined nose portion or pin 15 and threaded or machined socket portion 17 as in the FIGS. 1A, 1B form. However, before applying the shrinkable plastic enclosure or bag 18 over the respective coupling end 12 or 13, a continuous circumscribing ring 23 of grease, silicone, putty, caulking material, or similar deformable sealing compound, for example, is formed on the cylindrical exterior surface of the male collar formation 14 and female collar formation 16 as illustrated in FIG. 3A, and then the plastic film enclosure or bag 18 is shrunk into intimately tight embracing relation with the confronting surface portions of the male and female coupling end formations 12, 13 respectively and the immediately adjoining exterior surface neck portions 11' of the main pipe section 11, in a manner somewhat compressing the sealing compound ring 23 to a condition resembling that shown in FIG. 3B, producing a vapor or air tight seal at this location and thus preventing accumulation of any moisture inside the unit.

Instead of using closed end or closed bottom shrinkable plastic film enclosures or bags 18 of the type illustrated in FIGS. 1A and 3A, an alternative shrinkable plastic film enclosure or bag 18' as illustrated in FIG. 2A may be employed, made of the same material such as low density polyethylene film, as the bags 18 of the FIGS. 1A and 3A embodiments, but wherein the bag includes a cylindrical portion 18a extending from one open end 18b thereof to approximately the longitudinal mid-point of the film enclosure or bag 18' and having a truncated conical configuration over the remaining portion 18c thereof extending from substantially the mid-portion to a smaller diameter open end 18d, the truncated conical convergent portion 18c being referred to for convenience as the toe portion and the cylindrical portion 18a as the neck portion. This alternate film enclosure or bag configuration 18a is placed over the male coupling end 12 and female end coupling 13 respectively in the manner illustrated in FIG. 2B with the neck portion 18a being coextensive with the collar formation 14 or 16 and the associated threaded or machined portion 15 or 17 and the toe portion 18c is then everted or infolded to extend within the bore of the associated drill pipe section to be substantially coextensive axially with and be encircled by the cylindrical neck portion 18a. The smaller open end 18d of the truncated conical toe portion 18c terminates at a desired location spaced at least several inches inwardly of the female threaded portion 17 of the female or box coupling end 13, as illustrated, so that the toe portion 18c of the shrink wrap plastic film enclosures or bags 18' at each end provide protection against water from wind driven rain and the like accumulating in the region of the threaded or machined surface portions which are subject to water induced corrosion or rust. Thus the toe portion 18c forms, in effect, and infold or everted inner shrink wrap plastic enclosure or bag portion which, after application of heat to shrink the film material in place against the confronting surface portions of the drill pipe, provides the desired tool joint protection for the drill pipe. The procedure described in connection with FIGS. 2A and 2B may be used either without the ring or bead of sealing or caulking compound 23 in accordance with the version described in connection with FIGS. 1A and 1B, or may be used with the modified procedure described in connection with FIGS. 3A and 3B wherein the ring or bead of deformable sealant material 23 is employed.

Referring to FIGS. 4A and 4B, another procedure similar to that described in connection with FIGS. 3A and 3Bm may be used, wherein an end protecting cap member, indicated at 25 is used in addition to the shrink wrap plastic enclosure or bag 18. In this version, before enveloping the coupling end 12 or 13 in the enclosure or bag 18, an end protective cap 25 is applied having, for example, a truncated conical configuration providing a closed end wall portion 25a, a truncated conical portion 25b joined at its smaller diameter end to the end wall portion 25a, and an outwardly protruding annular lip flange portion 25c joining the other or larger diameter end of the truncated conical portion 25b. The truncated conical portion 25b is sized to closely conform to and encircle either the threaded nose or pin portion 15 of the male coupling end 12 or to conform to and fit closely against the female threaded portion 17c of the female coupling end 13. The appropriate end protector cap member 25 is applied over the associated male or female threaded portion 15 or 17 after first applying a sufficiently thick coating of grease 26' over the confronting male or female threaded portion 15 or 17 so that when the end protector cap member 25 is forced tightly thereagainst, a continuous circumferential ring or bead of excess grease exits outwardly from between the confronting annular surface portions of the lip flange portion 25c of each cap member 25 and the associated male or female coupling end, providing a protruding continuous ring of grease indicated at 26 in FIGS. 4A and 4B. A further sealing ring in the form of a continuous ring, herein indicated at 27, is formed several inches inwardly toward the center of the drill pipe section from the protruding ring of grease 26, the ring 27 being formed preferably of putty, silicone gel, caulking compound, or the like, or if desired of hardening or nonhardening plastic or rubber. The shrinkable plastic film enclosure or bag 18 is then positioned in an enveloping relation over the associated male or female coupling end 12 or 13 and is then shrunk tightly into intimate conforming contact with the confronting surface portions of the coupling end as previously described, which also compresses the grease ring 26 and second putty, dope, silicone, or the like ring 27 to substantially the configuration diagramatically shown in FIG. 4B, providing an occulsive seal as a barrier to air infiltration into the region of the threaded or machined surfaces.

Another version is shown in FIG. 5, illustrating an arrangement wherein a ring of grease 26 is provided near or at the end of the collar formations 14, 16 adjacent their junctures with the threaded or machined surface portions without providing an end protector cap member 25, and a second ring 27 of putty, silicone, caulking or the like, is also provided on the external surface of the collar formations 14, 16 spaced axially inwardly a short distance from the first or grease ring 26, and the shrinkable plastic film enclosures or bag 18 includes a hole, for example, as indicated at 18*f* and an adjoining lip formation 18*g* at the center of the bottom wall 19 of the enclosure or bag 18, tightly fitted against a vent tube 29. The lip 18*g* fits over the vent tube 29 inserted through the hole 18*f* so as to form a seal at that region to prevent moisture from infiltrating the bag, and the tube or vent 29 is of sufficient length, for example, about 30 inches to prevent wide driven water or rain from entering the interior of the drill pipe section. In case the drill pipe has an internal upset, the vent tube should extend inwardly at least 2 or 3 inches past the internal upset. In either case, the vent tube is designed to prevent accumulation of large amounts of water from wind driven rain and the like close to the threaded area. The purpose is to give any wind driven water a place to dissipate far from the threaded or machined surface areas of the pipe.

In either the case of the vented or the nonvented versions, a moisture barrier chemical can be inserted, if desired into the interior of the pipe being protected.

Yet another version is diagramatically illustrated in FIGS. 6A and 6B wherein shrink wrapped plastic film enclosure or bags 18 are provided at each end of the pipe section 10 in protective enveloping relation to the associated coupling end 12 or 13, and wherein a hole end associated lip similar to the hole and lip 18*f*, 18*g* of FIG. 5, is provided in the bottom or closed end wall of the enclosure or bag 18 to receive a long tube 30 at one end of the pipe section. After the other end of the pipe section is sealed by the shrink wrap film enclosure or bag 18 having a closed bottom or end wall, a long tube or hose 30 is inserted through the hole in the other enclosure or bag 18 to extend to a location near the closed or sealed end, and an inert gas such as argon, nitrogen, naphtha or other known inert gases, from a source as indicated at 31, is introduced into the bore of the pipe section 10 to purge the drill pipe of oxygen, by slowly withdrawing the inert gas supply tube 30 toward the end through which it is introduced while the inert gas is being supplied to the bore of the pipe section, and when the inert gas tube 30 is withdrawn through the opening in the introduction end, the opening is then quickly sealed so as to entrap the inert gas within the drill pipe section bore.

I claim:

1. The method of protecting threaded, cut or machined ends of oil field tubular elongated hollow cylindrical articles or the like against rust, pitting, moisture induced corrosion damage and adverse weather condition during outdoor storage thereof preparatory to field use, wherein the elongated tubular cylindrical articles each have machined end surface portions forming threaded coupling ends or the like, comprising coating machined end portions of each of the tubular articles with a grease-like protective compound over all of the machined surface portions thereof, enshrouding the grease-coated machined surface portions thereof at each end in a respective shrinkable plastic film bag having a closed end bottom wall portion and side walls joined thereto throughout the perimeter of the bottom wall portion, said side walls extending for a length axially of the tubular articles greater than the axial distance spanned by said machined and coated surfaces and to extend inwardly beyond the machined surfaces onto uncoated adjoining exterior cylindrical surface portions of the tubular article, and heat shrinking the shrinkable plastic film bag at each end of the tubular article in situ to form an air-tight shrink wrap film enclosure enveloping the machined and coated surface portions in substantially conforming relation to the exterior surface configuration of the respective enshrouded end portion of the tubular article and tightly embracing in moisture sealing relation said exterior cylindrical surface portions thereof.

2. The method defined in claim 1, including the additional step of forming at least one circumferentially continuous ring of deformable grease-like sealing material about said exterior cylindrical surface portions of the tubular cylindrical article in contact with such exterior surface throughout the circumference of the ring and spaced a short distance toward the mid-region of the tubular cylindrical article from said machined and coated surface portions thereof located so as to be also outwardly enveloped by portions of the plastic film bag, the plastic film bag at each end being shrunk tightly against said grease like ring of sealing material when shrunk in place to facilitate formation of an air tight seal thereat.

3. The method defined in claim 1, including the additional step of formation at least one circumferentially continuous ring of deformable caulking material about said exterior cylindrical surface portions of the tubular cylindrical article in contact with such exterior surface throughout the circumference of the ring and spaced a short distance toward the mid-region of the tubular cylindrical article from said machined and coated surface portions thereof located so as to be also outwardly enveloped by portions of the plastic film bag, the plastic film bag at each end being shrunk tightly against said caulking material ring of sealing material when shrunk in place to facilitate formation of an air tight seal thereat.

4. The method defined in claim 1, including the additional step of forming at least one circumferentially continuous ring of deformable silica gel material about said exterior cylindrical surface portions of the tubular cylindrical article in contact with such exterior surface throughout the circumference of the ring and spaced a short distance toward the mid-region of the tubular cylindrical article from said machined and coated surface portions thereof located as as to be also outwardly enveloped by portions of the plastic film bag, the plastic film bag at each end being shrunk tightly against said silica gel material ring of sealing material when shrunk in place to facilitate formation of an air tight seal thereat.

5. The method defined in claim 1 wherein said shrinkable plastic film bag to be positioned in enshrouding relation to the coated and machined surface portions has a first portion extending axially from one end thereof to its axial mid-region which is of cylindrical configuration and the remainder thereof forming a second portion which is of truncated conical configuration converging from said mid-region to an opposite end of said plastic bag, the method including the steps of positioning said plastic film bag so that the cylindrical first portion thereof concentrically outwardly encircles and overlies said coated and machined surface portions with the juncture between the cylindrical and truncated conical portions thereof substantially aligned with the adjacent end of said tubular article, and thereafter infolding said truncated conical second portion into inwardly extending relation within the hollow exterior of said tubular cylindrical article prior to heat shrinking the same.

6. The method defined in claim 2 wherein said shrinkable plastic film bag to be positioned in enshrouding relation to the coated and machined surface portions has a first portion extending axially from one end thereof to its axial mid-region which is of cylindrical configuration and the remainder thereof forming a second portion which is of truncated conical configuration converging from said mid-region to an opposite end of said plastic bag, the method including the steps of positioning said plastic film bag so that the cylindrical first portion thereof concentrically outwardly encircles and overlies said coated and machined surface portions with the juncture between the cylindrical and truncated conical portions thereof substantially aligned with the adjacent end of said tubular article, and thereafter infolding said truncated conical second portion into inwardly extending relation within the hollow exterior of said tubular cylindrical article prior to heat shrinking the same.

7. The method defined in claim 3 wherein said shrinkable plastic film bag to be positioned in enshrouding relation to the coated and machined surface portions has a first portion extending axially from one end thereof to its axial mid-region which is of cylindrical configuration and the remainder thereof forming a second portion which is of truncated conical configuration converging from said mid-region to an opposite end of said plastic bag, the method including the steps of positioning said plastic film bag so that the cylindrical first portion thereof concentrically outwardly encircles and overlies said coated and machined surface portions with the juncture between the cylindrical and truncated conical portions thereof substantially aligned with the adjacent end of said tubular article, and thereafter infolding said truncated conical second portion into inwardly extending relation within the hollow exterior of said tubular cylindrical article prior to heat shrinking the same.

8. The method defined in claim 4, wherein said shrinkable plastic film bag to be positioned in enshrouding relation to the coated and machined surface portions has a first portion extending axially from one end thereof to its axial mid-region which is of cylindrical configuration and the remainder thereof forming a second portion which is of truncated conical configuration converging from said mid-region to an opposite end of said plastic bag, the method including the steps of positioning said plastic film bag so that the cylindrical first portion thereof concentrically outwardly encircles and overlies said coated and machined surface portions with the juncture between the cylindrical and truncated conical portions thereof substantially aligned with the adjacent end of said tubular article, and thereafter infolding said truncated conical second portion into inwardly extending relation within the hollow exterior of said tubular cylindrical article prior to heat shrinking the same.

9. The method defined in claim 1, including the additional step of applying in confronting intimately abutting relation to the machined surface portions at each end of the tubular cylindrical articles an end cap member shaped to provide a surface conforming substantially to and disposed in intimately abutting confronting relation to threads of said machined end surface portions forming said threaded coupling ends, said cap members being forced tightly against the confronting machined surface portions of the tubular articles after coating the same with the grease-like protective compound with sufficient force to exude a ring of excess protective compound material in outwardly protruding relation from between the confronting machined surface portions and associated portions of said cap members, and said shrinkable plastic film bag being shrunk tightly against the exuded ring of excess protective compound material when shrunk in place to enhance formation of an air-tight seal.

10. The method defined in claim 2, including the additional step of applying in confronting intimately abutting relation to the machined surface portions at each end of the tubular cylindrical articles an end cap member shaped to provide a surface conforming substantially to and disposed in intimately abutting confronting relation to threads of said machined end surface portions forming said threaded coupling ends, said cap members being forced tightly against the confronting machined surface portions of the tubular articles after coating the same with the grease-like protective compound with sufficient force to exude a ring of excess protective compound material in outwardly protruding relation from between the confronting machined surface portions and associated portions of said cap members, and said shrinkable plastic film bag being shrunk tightly against the exuded ring of excess protective compound material when shrunk in place to enhance formation of an air-tight seal.

11. The method defined in claim 3, including the additional step of applying in confronting intimately abutting relation to the machined surface portions at each end of the tubular cylindrical articles and end cap member shaped to provide a surface conforming substantially to and disposed in intimately abutting confronting relation to threads of said machined end surface portions forming said threaded coupling ends, said cap members being forced tightly against the confronting machined surface portions of the tubular articles after coating the same with the grease-like protective compound with sufficient force to exude a ring of excess protective compound material and outwardly protruding relation from between the confronting machined surface portions and associated portions of said cap members, and said shrinkable plastic film bag being shrunk tightly against the exuded ring of excess protective compound material when shrunk in place to enhance formation of an air-tight seal.

12. The method defined in claim 4, including the additional step of applying in confronting intimately abutting relation to the machined surface portions at each end of the tubular cylindrical articles an end cap member shaped to provide a surface conforming substantially to and disposed in intimately abutting confronting relation to threads of said machined end surface portions forming said threaded coupling ends, said cap members being forced tightly against the confronting machined surface portions of the tubular articles after coating the same with the grease-like protective compound with sufficient force to exude a ring of excess protective compound material in outwardly protruding relation from between the confronting machined surface portions and associated portions of said cap members, and said shrinkable plastic film bag being shrunk tightly against the exuded ring of excess protective compound material when shrunk in place to enhance formation of an air-tight seal.

13. The method defined in claim 5, including the additional step of applying in confronting intimately abutting relation to the machined surface portions at each end of the tubular cylindrical articles an end cap member shaped to provide a surface conforming substantially to and disposed in intimately abutting confronting relation to threads of said machined end surface portions forming said threaded coupling ends, said cap members being forced tightly against the confronting machined surface portions of the tubular articles after coating the same with the grease-like protective compound with sufficient force to exude a ring of excess protective compound material in outwardly protruding relation from between the confronting machined surface portions and associated portions of said cap members, and said shrinkable plastic film bag being shrunk tightly against the exuded ring of excess protective compound material when shrunk in place to enhance formation of an air-tight seal.

14. The method of protecting threaded, cut or machined ends of oil field tubular elongated hollow cylindrical articles or the like against rust, pitting, moisture induced corrosion damage and adverse weather condition during outdoor storage thereof preparatory to field use, wherein the elongated tubular cylindrical articles each have machined threaded surface portions forming threaded coupling ends or the like, comprising coating said threaded portions of each of the tubular articles with a grease-like protective compound over all of the threads thereof, enshrouding the grease-coated threaded surface portions thereof at each end in a respective shrinkable plastic film bag having a closed end bottom wall portion and side walls joined thereto throughout the perimeter of the bottom wall portion, said side walls extending for a length axially of the tubular articles greater than the axial distance spanned by said threaded and coated surfaces and to extend inwardly beyond the machined surfaces onto uncoated and unthreaded adjoining exterior cylindrical surface portions of the tubular article, and heat shrinking the shrinkable plastic film bag at each end of the tubular article in situ to form an air-tight shrink wrap film enclosure enveloping the threaded and coated surface portions in substantially conforming relation to the exterior surface configuration of the respective enshrouded end portion of the tubular article and tightly embracing in moisture sealing relation said exterior cylindrical surface portions thereof.

15. The method of protecting threaded, cut or machined ends of oil field tubular elongated hollow cylindrical articles or the like against rust, pitting, moisture induced corrosion damage and adverse weather condition during outdoor storage thereof preparatory to field use, wherein the elongated tubular cylindrical articles each have machined threaded surface portions forming threaded coupling ends or the like, comprising coating said threaded portions of each of the tubular articles with a grease-like protective compound over all of the threads thereof, enshrouding the grease-coated threaded surface portions thereof at each end in a respective shrinkable plastic film bag having a closed end bottom wall portion and side walls joined thereto throughout the perimeter of the bottom wall portion, said side walls extending for a length axially of the tubular articles greater than the axial distance spanned by said threaded and coated surfaces and to extend inwardly beyond the machined surfaces onto uncoated and unthreaded adjoining exterior cylindrical surface portions of the tubular article, forming a circumferentially continuous ring of deformable grease-like sealing material about said exterior cylindrical unthreaded surface portions of the tubular cylindrical article in contact with such exterior surface throughout the circumference of the ring and spaced a short distance toward the mid-region of the tubular cylindrical article from said threaded and coated surface portions thereof to be also outwardly enveloped by portions of the plastic film bag, and heat shrinking the shrinkable plastic film bag at each end of the tubular article in situ to form an air-tight shrink wrap film enclosure enveloping the threaded and coated surface portions and ring of grease-like sealing material adjacent the same in substantially conforming relation to the exterior surface configuration of the respective enshrouded end portion of the tubular article and tightly embracing in moisture sealing relation said exterior cylindrical surface portions thereof.

16. The method defined in claim 14, including the additional step of applying in confronting intimately abutting relation to the machined surface portions at each end of the tubular cylindrical articles an end cap member shaped to provide a surface conforming substantially to and disposed in intimately abutting confronting relation to said threads said cap members being forced tightly against the confronting threaded surfaced portions of the tubular articles after coating the same with the grease-like protective compound with sufficient force to exude a ring of excess protective compound material in outwardly protruding relation from between the confronting threaded surface portions and associated portions of said cap members, and said shrinkable plastic film bag being shrunk tightly against the exuded ring of excess protective compound material when shrunk in place to enhance formation of an air-tight seal.

17. The method defined in claim 15, including the additional step of applying in confronting intimately abutting relation to the machined surface portions at each end of the tubular cylindrical articles an end cap member shaped to provide a surface conforming substantially to and disposed in intimately abutting confronting relation to said threads, said cap members being forced tightly against the confronting threaded portions of the tubular articles after coating the same with the grease-like protective compound with sufficient force to exude a ring of excess protective compound material and outwardly protruding relation from between the confronting threaded portions and associated portions of said cap members, and said shrinkable plastic film bag being shrunk tightly against the exuded ring of excess protective compound material when shrunk in place to enhance formation of an air-tight seal.

18. The method defined in claim 1, including the steps of providing an elongated inert gas purging tube at one end of the tubular cylindrical article extending through the bottom wall of the shrinkable plastic film bag after heat shrinking the same in situ on the tubular article, supplying inert gas through said tube while progressively moving the tube axially to withdraw an open discharge end of the tube from a location near an opposite end of the tubular article to and through the end enshrouded by the plastic film bag penetrated by said tube while supplying the inert gas thereto to purge the hollow interior of the tubular article of oxygen, and sealing the bottom wall portion of the plastic film bag penetrated by said tube after withdrawal of the tube thereof.

19. The method defined in claim 2, including the steps of providing an elongated inert gas purging tube at one end of the tubular cylindrical article extending through the bottom wall of the shrinkable plastic film bag after heat shrinking the same in situ on the tubular article, supplying inert gas through said tube while progressively moving the tube axially to withdraw an open discharge end of the tube from a location near an opposite end of the tubular article to and through the end enshrouded by the plastic film bag penetrated by said tube while supplying the inert gas thereto to purge the hollow interior of the tubular article of oxygen, and sealing the bottom wall portion of the plastic film bag penetrated by said tube after withdrawal of the tube thereof.

* * * * *